(12) United States Patent
Dimou et al.

(10) Patent No.: US 9,565,694 B2
(45) Date of Patent: Feb. 7, 2017

(54) METHOD AND APPARATUS FOR REDUCING INTERCELL INTERFERENCE

(71) Applicant: Telefonaktiebolaget L M Ericsson (publ), Stockholm (SE)

(72) Inventors: Konstantinos Dimou, Stockholm (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 13/953,822

(22) Filed: Jul. 30, 2013

(65) Prior Publication Data

US 2013/0336142 A1 Dec. 19, 2013

Related U.S. Application Data

(62) Division of application No. 13/327,486, filed on Dec. 15, 2011, now Pat. No. 8,761,779.

(Continued)

(51) Int. Cl.
*H04B 1/10* (2006.01)
*H04B 15/00* (2006.01)
(Continued)

(52) U.S. Cl.
CPC ......... *H04W 72/1231* (2013.01); *H04W 24/02* (2013.01); *H04W 28/048* (2013.01); *H04W 84/045* (2013.01)

(58) Field of Classification Search
CPC ............. H04W 72/1231; H04W 24/02; H04W 28/048; H04W 84/045
(Continued)

(56) References Cited

U.S. PATENT DOCUMENTS 8,194,584 B2 * 6/2012 Nakatsugawa ............... 370/318
8,200,263 B2 6/2012 Wei et al.
(Continued)

FOREIGN PATENT DOCUMENTS

| EP | 2063678 A1 | 5/2009 |
|---|---|---|
| WO | 2010105231 A1 | 9/2010 |
| WO | 2011029469 A1 | 3/2011 |

OTHER PUBLICATIONS

Author Unknown. "Carrier Aggregation in Heterogeneous Networks—" 3GPP TSG RAN WG1 #57bis, R1-092705, Los Angeles, CA, USA, Jun. 29-Jul. 3, 2009.
(Continued)

*Primary Examiner* — Nguyen Vo
(74) *Attorney, Agent, or Firm* — Murphy, Bilak & Homiller, PLLC (57) ABSTRACT

In one aspect, the present invention provides methods and apparatuses for detecting that a wireless communication device in a serving cell is experiencing excessive interference variance, detecting a transmission pattern of interfering transmissions giving rise to such variance, and correspondingly adjusting scheduling of the device as a function of the detected transmission pattern, to at least partly avoid the interfering transmissions. An advantageous feature of such operation is that the determination of excessive interference variance and the determination of the transmission pattern associated with that varying interference can be done by a network node, e.g., the device's serving base station, or by the device, without requiring backhaul signaling or other inter-node cooperation in the network.

8 Claims, 6 Drawing Sheets

Related U.S. Application Data (60) Provisional application No. 61/439,455, filed on Feb. 4, 2011.

(51) Int. Cl.
*H04W 72/12* (2009.01)
*H04W 24/02* (2009.01)
*H04W 28/04* (2009.01)
*H04W 84/04* (2009.01)

(58) Field of Classification Search
USPC ............. 455/446, 456.1, 456.4, 456.5, 63.1, 63.3,455/67.11, 67.13
See application file for complete search history.

(56) References Cited

U.S. PATENT DOCUMENTS

| | | | |
|---|---|---|---|
| 8,422,461 B2 | 4/2013 | Dickey | |
| 8,493,919 B2 | 7/2013 | Leung | |
| 8,934,896 B2 | 1/2015 | Zhu | |
| 2007/0280147 A1* | 12/2007 | Catreux-Erceg et al. | 370/318 |
| 2008/0070510 A1* | 3/2008 | Doppler et al. | 455/69 |
| 2009/0305741 A1* | 12/2009 | Takeuchi et al. | 455/561 |
| 2009/0316591 A1 | 12/2009 | Reial et al. | |
| 2010/0150007 A1* | 6/2010 | Jung et al. | 370/252 |
| 2012/0021753 A1 | 1/2012 | Damnjanovic et al. | |
| 2012/0134275 A1 | 5/2012 | Choi et al. | |
| 2012/0140690 A1 | 6/2012 | Choi et al. | |
| 2012/0178482 A1 | 7/2012 | Seo et al. | |
| 2012/0202554 A1 | 8/2012 | Seo et al. | |
| 2012/0213189 A1 | 8/2012 | Choi et al. | |
| 2013/0114562 A1 | 5/2013 | Seo et al. | |

OTHER PUBLICATIONS

Author Unknown. 3GPP TR 36.921, 1.0.0 {Dec. 2009}. 3rd Generation Partnership Project; Technical Specification Group Radio Access Netw'orks; Evolved Universal Terrestrial Radio Access {E-UTRA}; FDD Home eNodeB (HeNB) Radio Frequency (RF) requirements anaylsis (Release 9). Dec. 2009.

Bergstrom, M. "Analysis of Interference and Performance in Heterogeneously Deployed L TE Systems." Master of Science Thesis, KTH School of Information and Communications Technology, Department of Communication Systems, Stockholm, Sweden, Sep. 2010.

Landstrom, S. et al. "Deplyoment Aspects of L TE Pico Nodes." IEEE International Conference on Communications Workshops, Jun. 5-9, 2011.

Liang, Y. et al. "Evolution of Base Stations in Cellular Netw'orks: Denser Deployment versus Coordination." IEEE International Conference on Communications, May 19-23, 2008.

Fodor, Gabor et al., "Intercell Interference Coordination in OFDMA Networks and in the 3GPP Long Term Evolution System", Journal of Communications, Vol. 4, No. 7, Aug. 2009, Academy Publisher.

* cited by examiner

METHOD AND APPARATUS FOR REDUCING INTERCELL INTERFERENCE

RELATED APPLICATIONS

This application is a divisional of U.S. application Ser. No. 13/327,486, filed on 15 Dec. 2011, and it further claims priority under 35 U.S.C. §119 from the U.S. provisional application filed on 4 Feb. 2011 and assigned application Ser. No. 61/439,455, and the content of both such applications is incorporated herein by reference in its entirety.

TECHNICAL FIELD

The present invention generally relates to wireless communication networks and particularly relates to reducing interference in such networks.

BACKGROUND

New approaches are required to meet the constantly increasing demand for high data rates in cellular networks. One challenge for network operators is determining how best to evolve their existing cellular networks to meet the requirement for higher data rates. A number of approaches are possible, including: (a) increasing the density of existing macro base stations; (b) increasing the cooperation between macro base stations; or (c) deploying smaller base stations in areas where high data rates are needed within the macro base station grid.

The last option, the use of smaller base stations among a grid of larger, macro base stations is referred to in the related literature as a "Heterogeneous Network" or "Heterogeneous Deployment." The "layer" of smaller base stations is termed a "micro" or "pico" layer.

Building a denser macro base station grid while simultaneously enhancing the cooperation between macro base stations can be used to meet the requirement for higher data rates. However, such an approach is not necessarily an attractive option, because of the costs and delays associated with the installation of macro base stations. Such costs are especially significant in urban areas. Further, dense deployments of macro base stations leads to significantly higher amounts of signaling because of frequent handovers for wireless communication devices moving at high speeds through the denser macro layer grid.

In contrast, a macro layer grid of "normal" density can serve those devices, equivalently referred to as "users," moving at high speed, as well as provide wider areas of service where the demand for high data rates is less, while in the same heterogeneous network, a micro layer grid of smaller base stations can be deployed in service areas having a higher density of users requiring high data rates. The service areas of these smaller base stations may be regarded as "hotspots" within the larger macro service areas. The deployment of small base stations within an already existing macro layer grid is an appealing option at least in some circumstances, because smaller base stations generally are more cost-efficient than macro base stations, and their deployment times are generally shorter as well.

Figure 1:
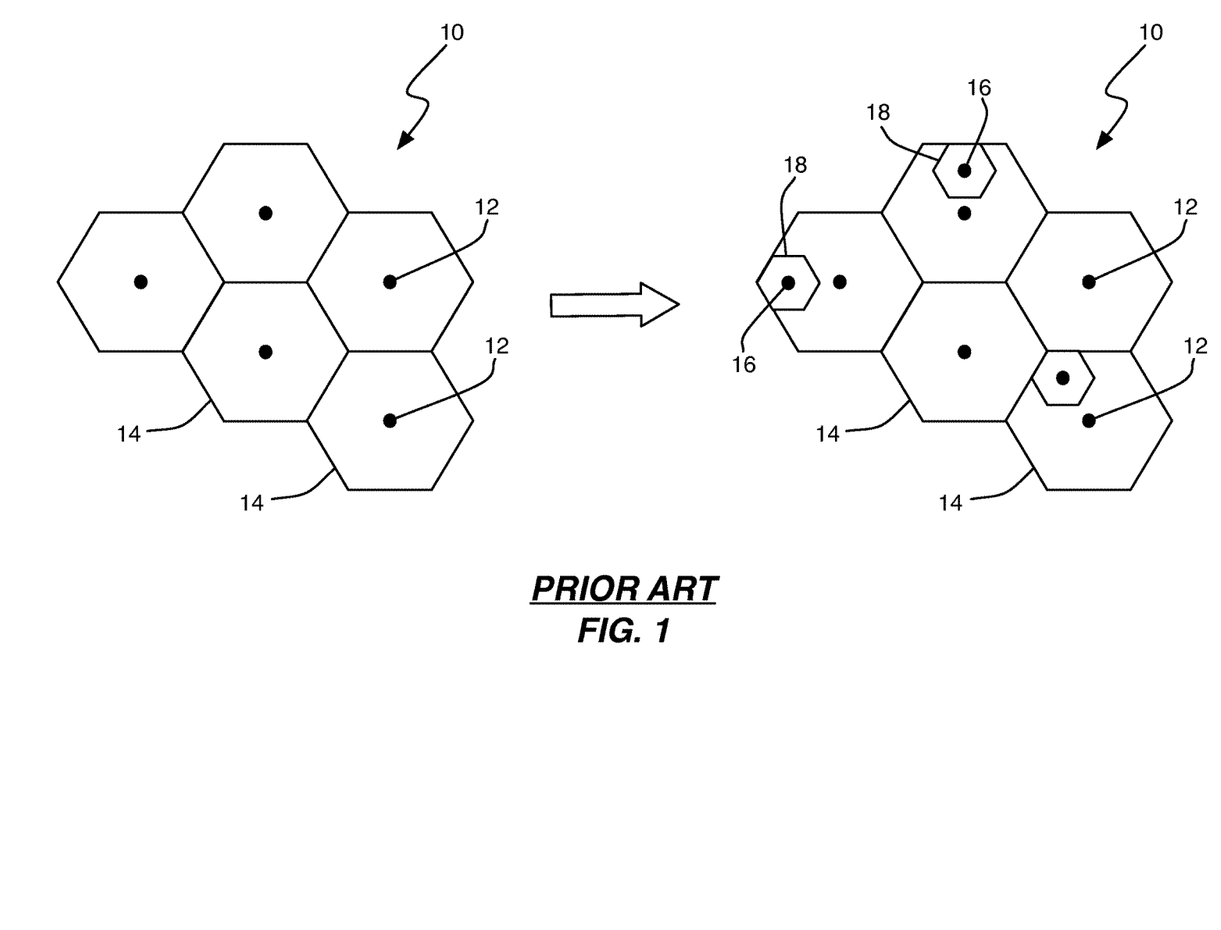
FIG. 1 illustrates a conventional wireless communication network, including a number of "macro" or large-area base stations that form a macro layer grid, with each macro base station providing a macro cell of wireless service, and also illustrates that conventional network supplemented with a micro or pico layer grid of smaller base stations, as is known.

FIG. 1 shows the basic principle of heterogeneous deployments. In particular, FIG. 1 depicts a network 10 on the left side of the arrow, having a number of macro base stations 12, each defining a cell 14, which may be understood as a geographic area of service for a given set of wireless resources—e.g., the intersection or combination of a particular carrier frequency and a particular geographic region.

The same network 10 appears on the right side of the arrow, except that the network 10 is now enhanced with a micro layer grid of smaller base stations 16. Each smaller base station 16 provides service in a corresponding micro or pico cell 18. These micro cells 18 appear as hotspots within the larger macro cells 14, and may be understood as sub-regions within the network 10 that are tailored for higher density usage and/or for higher data rate services.

One feature that is associated with heterogeneous network deployments is "muting," or Time Division Mode (TDM) for transmissions from certain network nodes. Such nodes include the macro base stations 12 and/or the micro or pico base stations 16. For example, in heterogeneous network systems featuring "Open Access" (OA) pico base stations, the macro layer mutes its transmissions during certain Transmission Time Intervals (TTIs), so as not to interfere with users connected to the pico base stations. Such muting of macro base stations is necessary, to avoid creating high interference to users in the extended range of pico cells in cases where the pico cells extend their coverage by using specific cell selection offsets. (Here, it will be understood that the "macro layer" refers to the macro base stations 12 and their operations, while the "micro layer" or "pico layer" refers to the micro or pico base stations 16 and their operations.)

One or more of the pico base stations 16 may be "Home eNodeBs" or other type of low-power access point that often is assigned to and used by a particular subscriber or group of subscribers within a particular premise, such as a home or business. Home eNodeBs, also referred to as HeNBs, use Closed Subscriber Groups (CSGs) to restrict access to certain user equipment (UEs) or other wireless communication devices, so that only authorized devices can gain network access through a given HeNB. These CSG-based HeNBs mute their transmissions in certain TTIs, to avoid causing downlink (DL) interference to nearby users that are connected to a macro base station 12 rather than to the proximate HeNB. In an example case, imagine a UE that is nearby a given HeNB but not part of the CSG defined for that HeNB. In such a case, the UE is within signal range of the HeNB but is not permitted to use it, and therefore must connect to the network 10 through the macro base station 12 that also provides overlapping service coverage in that area.

The TD mode of transmission is also used for inbound relaying for relay nodes (RNs) and relay-supported users. In such operation, the relay is not muting its transmission to users, but the relay at such time instants listens for transmissions from its supporting macro base station 12. In Long Term Evolution (LTE) based networks, the supporting macro base station 12 is an eNodeB or eNB, and is commonly referred to as a "donor" eNB (DeNB). Although this TD mode of transmission of neighboring/overlapping cells is currently specified only for heterogeneous network deployments, in the future the TD mode of transmission may be applied for homogeneous networks as well.

HeNBs and other types of pico base stations 16 are often placed in areas of poor macro cell coverage, such as at the borders between macro cells 14. Consequently, the use of TD mode transmissions by pico base stations 16 generates highly varying and "bursty" other-cell interference levels within the signal ranges of the pico base stations 16.

Typically, CSG Home eNBs, OA pico eNBs and relay nodes are placed at locations of poor macro layer coverage, close to macro cell borders for example, and TD mode of transmission therefore results in nearby UEs experiencing other-cell interference that is highly varying and bursty in nature. Further, TD mode transmissions from macro base stations 12 cause similarly, bursty and highly varying levels of other-cell interference for UEs that are within range of such TD mode transmissions but are served by other macro base stations 12.

One approach to alleviating the effects of interference variance focuses on a relay node using its DeNB to notify neighbor cells with respect to the transmission patterns used by the relay node. The notification allows a neighbor cell, for example, to avoid transmitting or otherwise allocating air interface resources to its cell-edge users at times when the relay nodes in the other cell are transmitting or receiving. This approach may be regarded as a type of collision avoidance, and there are several key assumptions underlying this type of collision-avoidance operation: (a) there is a means of communication between neighboring macro base stations 12, e.g., the "X2" interface that interlinks eNBs in an LTE-based wireless communication network; and (b) not all cell edge users are affected by relay-node or other low-power-node (LPN) transmissions.

The assumption of inter-base-station communications generally holds true in LTE networks, for example, at least if the involved eNBs belong to the same network operator. However, eNBs belonging to different network operators generally are not connected. Moreover, other types of network transceivers, such as HeNBs, may employ muting schemes, without necessarily notifying the closest macro eNBs. Hence, even if X2 or other inter-node interfaces are available (such as the "S1" interface between an eNB and a supporting core network entity), it is not always given that neighbor eNBs are notified of the transmission patterns of LPNs that may affect their transmissions or those of their users. Problematically, simulation results have shown that a major source of other cell-interference in conventional heterogeneous networks (without any modifications in cell selection) are macro base stations 12 and pico base stations 16 (or other LPNs), at least for users operating close to such nodes.

SUMMARY

In one aspect, the present invention provides methods and apparatuses for detecting that a wireless communication device in a serving cell is experiencing excessive interference variance, determining a transmission pattern of interfering transmissions giving rise to such variance, and correspondingly adjusting scheduling of the device as a function of the detected transmission pattern, to at least partly avoid the interfering transmissions. An advantageous feature of such operation is that the determination of excessive interference variance and the determination of the transmission pattern associated with that varying interference can be done by a network node, e.g., the device's serving base station, or by the device, without requiring backhaul signaling or other inter-node cooperation in the network.

As a non-limiting example, the present invention advantageously allows devices operating at a cell edge to detect the time division (TD) transmission pattern of neighboring macro or pico base stations (or other low power nodes, LPNs), based on determining the variance in other-cell interference as experienced by the devices. The network uses such determinations to make scheduling adjustments for the devices, to at least partly avoid the interfering transmissions and thereby improve spectral efficiency within the network. Alternatively, the network itself detects that given devices are experiencing excessive interference variance, based, for example, on evaluating measurement reports from those devices. The network in such embodiments also detects the transmission patterns giving rise to such variances at the devices, and makes corresponding scheduling adjustments for one or more of those devices. In turn, such operation yields better throughput and more efficient communication within the network.

In one embodiment, a network node is configured for use in a wireless communication network that provides communication services in a plurality of cells. The example network node includes a communication interface that is configured to receive signaling directly or indirectly from a wireless communication device having an associated one of the cells in the network as its serving cell. Correspondingly, the network node includes a processing circuit that is configured to detect from the signaling that the device is experiencing excessive interference variation arising from interfering transmissions by an interfering node in or proximate to the serving cell of the device. Further, the processing circuit determines a transmission pattern for the interfering transmissions and adjusts the scheduling of communications with the device in the serving cell based on the transmission pattern, to at least partly avoid coincidence with the interfering transmissions.

Here, "coincidence" includes, for example, use of the same frequency and/or time resources. In one such example, avoiding the interfering transmissions means not scheduling transmissions to and/or from the device on the same frequencies or times as used for the interfering transmissions.

In another embodiment, a network node, such as a serving base station, schedules communications with a wireless communication device for a cell in a wireless communication network, where the cell acts as the serving cell for the device. The method includes detecting that the device is experiencing excessive interference variation arising from interfering transmissions by an interfering node in or proximate to the serving cell of the device, and further determining a transmission pattern for the interfering transmissions. The method also includes adjusting the scheduling of communications with the device in the serving cell based on the transmission pattern, to at least partly avoid coincidence with the interfering transmissions.

In another example embodiment, the present invention comprises a wireless communication device, such as a user equipment (UE), that is configured for operation in a wireless communication network, where the device includes a wireless communication transceiver that is configured to communicate with a serving node in the wireless communication network, such as a serving base station. The device further includes a measurement circuit that is configured to generate measurements reflecting interference levels at the device, and a processing circuit that is configured to calculate an interference variance from the measurements. The processing circuit is also configured to send, e.g., via the wireless communication transceiver, an indication to the serving node, responsive to determining that the interference variance exceeds a defined interference threshold that is signaled to the device. Thus, in one embodiment, the serving node or other network entity signals a threshold value to the device, and the device sends a return indication responsive to determining that the variance in interference, as measured by the device, exceeds the signaled threshold value.

Another example embodiment includes a method of reporting interference conditions from a wireless communication device to a wireless communication network. The method includes performing measurements reflecting interference levels at the device, and further includes calculating an interference variance from such measurements. Correspondingly, the method includes sending an indication from the device, responsive to determining that the interference variance exceeds a defined interference threshold that is signaled to the device.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 2:
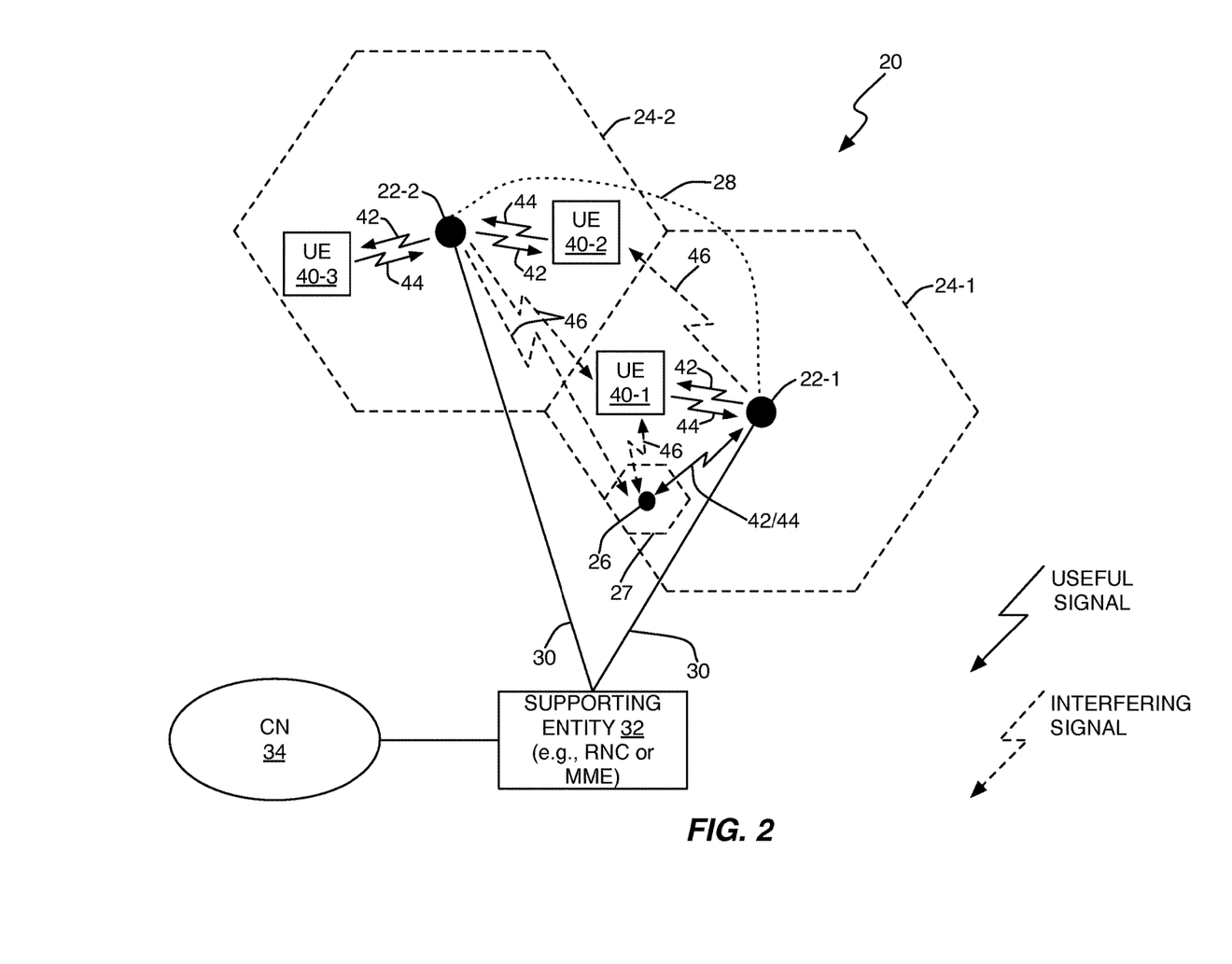
FIG. 2 is a block diagram partially illustrating one embodiment of a wireless communication network according to the present invention, wherein, for example, one or more base stations in the network are configured to detect transmission patterns of interfering transmissions giving rise to excessive interference variance at served users, and correspondingly adjust user scheduling to at least partly avoid the interfering transmissions.

FIG. 2 illustrates a wireless communication network 20 in relevant part. As a non-limiting example, the wireless communication network 20 ("network 20" hereafter) comprises a cellular communication network configured to operate according to the Long Term Evolution (LTE) or LTE Advanced specifications. In another non-limiting example, the network 20 is configured to operate according to the Wideband Code Division Multiple Access (WCDMA) specifications.

The diagram depicts two base stations 22-1 and 22-2. There may be many base stations 22 in the network 20, and the reference number "22" is used in both the plural and singular sense, herein, such as in generic singular reference to a "base station 22" or to plural "base stations 22." The suffixes are used where helpful for clarity, such as to distinguish between individual base stations 22.

Further, those skilled in the art will appreciate that the term "base station" itself is meant as a generic reference to a network node that provide the "air interface" for communicating with user equipment (UEs) and/or other wireless communication devices. In LTE-based embodiments of the network 20, the base stations 22 are referred to as "eNodeBs" or "eNBs." In WCDMA embodiments, the base stations 22 are referred to as "NodeBs."

Each base station 22 provides wireless service over a geographic region and this combination of service and region is referred to as a "cell" 24 in the network 20. While one cell 24 is shown per base station 20, e.g., the base station 22-1 provides a cell 24-1 and base station 22-2 provides a cell 24-2. In this disclosure, the reference number "24" is used in both plural and singular reference to a given cell or to given cells, and suffixes are used where needed for clarity. Those skilled in the art will appreciate that each cell 24 generally is associated with specific resources, such as a given carrier frequency and/or bandwidth, and that multi-carrier embodiments of the base stations 22 may provide multiple cells 24, which may be fully or partially overlapping one another geographically. Such details however are not germane to the focus of this disclosure.

Of more interest herein, the base stations 22 are "macro" base stations that provide service over relatively large cell areas. The base stations 22 therefore can be understood as defining a macro base station grid, operating as a macro layer of the network 20. In turn, there are one or more micro or pico base stations 26 in the network 20, each providing service in a micro or pico cell 27. For the remainder of this discussion, the term "micro base station" will be used, but those of ordinary skill in the art will appreciate that that term as used herein is meant to encompass a wide range of low-power nodes (LPNs), such as relay nodes (RNs), Home eNodeBs (HeNBs) and other transceivers that provide service—e.g., high data rate service—over a relatively small area in comparison to the macro base stations 22. For example, the micro base stations 26 at issue here may provide coverage within a single residence, building, or localized metropolitan area, or may be a mix of different types of LPNs.

Although only one micro base station 26 and its corresponding micro cell 27 are shown, it will be appreciated that there may be additional micro base stations 26 distributed within the network 20. Such micro base stations 26 form a micro base station grid providing a micro base station layer of the network 20.

The macro base stations 22 are communicatively linked via an inter-base station interface 28, which allows control signaling and data to be exchanged between the macro base stations 22. In an LTE-based embodiment, the inter-base station interface is referred to as the "X2" interface.

The macro base stations 22 are also communicatively linked to one or more supporting entities through network communication interfaces 30. For example, the macro base stations 22 are linked to a supporting entity 32, which may be in the Radio Access Network (RAN) portion of the network 22, or in the Core Network (CN) portion of the network 22. In an example LTE embodiment, the supporting entity 32 is a Mobility Management Entity (MME) in the CN 34, for example. In an example WCDMA embodiment, the supporting entity 32 is a Radio Network Controller (RNC) in the RAN. The particular type or implementation of the supporting entity is not critical; rather, the supporting entity 32 should be understood as an alternative or additional mechanism for sharing or distributing information among the macro base stations 22.

The macro and/or micro base stations 22 and 26 support communications with one or more wireless communication devices 40, and generally with a plurality of wireless communication devices 40 that are supported by the network 20. Some or all of these devices 40 may be mobile, such as feature phones, smart phones, or other types of cellular communication handsets. Of course, these are non-limiting examples, and one or more of the wireless communication devices may be modems or other network adaptors, etc. To the extent that such devices 40 often, but necessarily, include items of user equipment, which are referred to as "UE" in singular form and "UEs" in plural form.

While the remainder of this disclosure uses the terms "wireless communication device" and "UE" interchangeably, it should be understood that the term "UE" is not intended herein as a limiting or narrow term. For example, a UE may be an embedded communication device, such as used in machine-to-machine applications. In any case, when helpful for clarity, suffixes distinguish between individual UEs 40, such as UE 40-1, 40-2, or 40-3. Those skilled in the art will appreciate that each cell 24 and/or cell 27 may "serve" multiple UEs 40. As noted, some or all of the UEs 40 may be mobile, e.g., cellular handsets such as smartphones, computer modems or other network access devices, etc.

The base stations 22 and/or 26 transmit downlink (DL) signals 42 to UEs 40, and receive uplink (UL) signals 44 from UEs 40. One also sees that the DL and/or UL signals 42 and 44 transmitted in one cell 24 or 27 interfere with signal reception in neighboring (adjacent) cell(s) 24 or 27. For example, at least some of the DL transmissions from the macro base station 22-2 appear as interfering signals 46 with respect to the UE 40-1. Additionally, or alternatively, those same DL transmissions potentially interfere with the micro base station 26 in cell 24-1 and/or with any UEs 40 supported in the cell 27 served by the micro base station 26. Conversely, assuming the UE 40-1 is supported by the macro base station 22-1, transmissions by the micro base station 26 may interfere with the UE 40-1.

For further clarification and as a further example, the DL signal 42 from the base station 22-2 is a useful signal from the perspective of the UE 40-2, because that base station serves that UE. However, the DL signal 42 from the base station 22-2 is an interfering signal 46, from the perspective of the UE 40-1, which is depicted as being served by the base station 22-1. However, the UE 40-1 is positioned near the edge of the cell 24-1, adjacent to the cell 24-4, and may therefore experience potentially high other-cell interference. FIG. 2 depicts useful signals in solid lines and interfering signals in dashed lines. Notably, the foregoing cases are just example interference scenarios and those of ordinary skill in the art will appreciate that there may be other inter-cell (other-cell) interference scenarios possible within the network 20.

Of particular interest is that the interference experienced at any given UE 40, for example, may vary significantly over time. See FIG. 3, which is not shown in any numeric scale, but graphically illustrates that the level of interference at the UE—e.g., as measured in received interfering signal power—can and often does vary significantly. Such variances arise in particular in systems having user scheduling and/or TD mode transmissions, which are characterized by transmissions of varying transmit resource allocations, transmit data rates, intervals, and/or powers.

Figure 4:
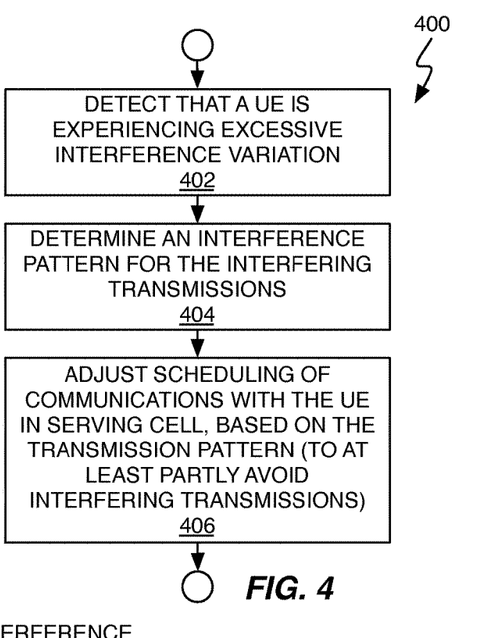
FIG. 4 is a logic flow diagram of one embodiment of a method of adjusting user scheduling at a wireless communication network base station, according to the present invention.

FIG. 4 illustrates a processing method 400 in accordance with one embodiment of the present invention, for scheduling communications with a UE 40, for a serving cell 24 or 27 in the network 20. Any suitable network node, such as the macro base station 22 in the serving cell 24 of the UE 40 (or the micro base station 26 of the cell 27) carries out the method 400, which includes detecting (Block 400) that the UE 40 (or any UE connected to the micro cell 27) is experiencing excessive interference variation arising from interfering transmissions 46 by an interfering node 22 or 26 in or proximate to the serving cell 24.

In one or more of the embodiments of the present invention, the detection and determination of the transmission pattern of interfering transmissions at steps 402 and 404 might lead to transmission of a signal from the base station requesting neighbor base stations to transmit their TDM transmission pattern, in case these neighbor base stations have a TDM transmission pattern.

The method 400 further includes determining a transmission pattern for the interfering transmissions 46 (Block 404), adjusting scheduling of communications with the UE 40 in the serving cell 24 based on the transmission pattern, to at least partly avoid coincidence with the interfering transmissions 46 (Block 406). Adjusting the scheduling of communications with the UE 40 in such instances comprises, for example, adjusting the times during which scheduled transmissions are made via the DL signaling 42 to the UE 40, to partly or wholly avoid temporal coincidence with the interfering transmissions 46. Such adjustments are made by, for example, determining the transmission pattern in terms of time, which may be characterized according to defined transmission intervals used by the network 20—e.g., regularly recurring transmission time intervals (TTIs), frames, subframes, slots, subslots, etc.

Figure 5:
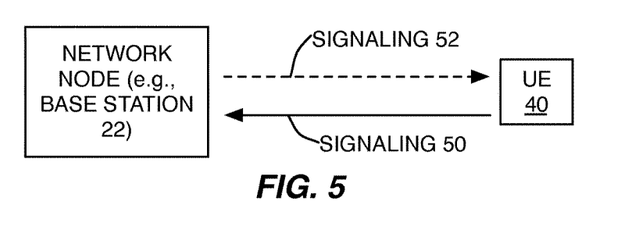
FIG. 5 is a diagram illustrating downlink and uplink signaling, as is used in one or more embodiments of the present invention.

In one or more embodiments, and as shown in FIG. 5, UL signaling 50 from the UE 40 supports the method 400, as performed by the macro base station 22 and/or by a pico base station 26. FIG. 5 further depicts additional signaling 52 from or through a macro base station 22 or a pico base station 26 to the UE 40, in one or more embodiments.

Figure 6:
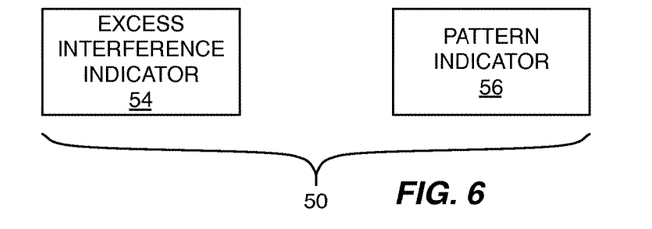
FIG. 6 is a diagram of signaled information elements from a wireless communication device to a base station, according to an embodiment of the present invention.

For example, according to FIG. 6, the signaling 50 includes an excess interference indicator 54 and, optionally, a pattern indicator 56. In at least one embodiment, therefore, the method 400 includes the serving base station 22 (or 26) detecting that the UE 40 is experiencing excessive interference variation based on receiving an explicit indication of excessive interference variation from the UE 40. That is, in one or more embodiments, the UE 40 is configured to measure or otherwise evaluate the variation in the interference levels it is experiencing and to set the excess interference indicator 54 as a flag or other explicit indicator upon determining that the variation in interference levels at the UE 40 is "excessive." In at least one such embodiment, the UE 40 is further configured to discern or otherwise detect a transmission pattern of such interference variation, and to indicate that pattern via the pattern indicator 56.

As a non-limiting example, the transmission pattern is expressed in terms of transmission timing information, e.g., frame or subframe numbers. For example, in a manner consistent with 3GPP conventions, a pattern indicating 1:8 or 2:8 means that the first subframe out of eight consecutive subframes is an Almost Blank Sub-frame (where the activity is switched off or the transmission power is reduced). This approach thus represents a non-limiting example of how transmission patterns can be expressed or indicated. In an alternative non-limiting example, transmission pattern information can be represented in the form of a bitmap based on "0" and "1" values, such as "11001001100 . . . 1," where "1" connotes interference. In an alternative embodiment, the opposite logic is used, in which "0" connotes interference.

Additionally or alternatively, the transmission pattern is expressed in terms of frequencies, codes, or other channelization resources associated with the interfering transmissions, as experienced at the UE 40. Other formulations are also contemplated herein, and the particular expression of the transmission pattern can be dependent on the type of multi-user access used in the network 20. In any case, in at least one embodiment of the method 400, the base station 22 determines the transmission pattern based on receiving an explicit indication of it, such as the pattern indicator 56 shown in FIG. 6. As noted, the pattern indicator 56 is based on the UE 40 determining the transmission pattern and indicating that pattern to the base station 22 via UL signaling 50.

Figure 7:
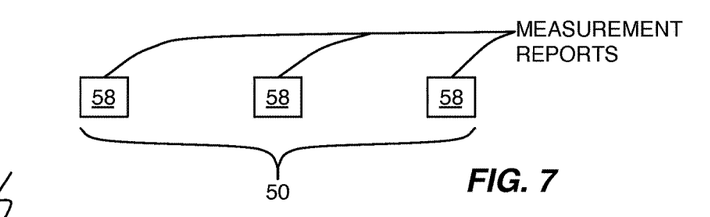
FIG. 7 is a diagram of signaled information elements from a wireless communication device to a base station, according to another embodiment of the present invention.

FIG. 7 illustrates another embodiment, where the UL signaling 50 includes measurement reports 58, e.g., Channel Quality Indicator (CQI) reports that are sent at a rate fast enough for the base station 22 to detect the interference variance at the UE 40 on an appropriate time scale, and to determine the corresponding transmission pattern from the measurement reports 58.

In at least one embodiment, the UE 40 is configured to send such measurement reports at a 1 KHz rate or faster. In an LTE embodiment, measurements may be done on subframes. Additionally, in one or more embodiments, the base station 22 is configured to command the desired measurement reporting rate and can therefore select those UEs 40 from which it wants higher-rate reporting. In at least one such embodiment, the base station 22 detects cell-edge UEs 40 and has directs one or more of those cell-edge UEs 40 to report their measurements at a higher rate, because they are more susceptible to interference caused by other-cell UEs 40 and/or other-cell base stations 22 or 26. The same logic is applied in one or more embodiments with respect to known hotspots, where UEs 40 are operating in or around an area where a micro base station 26 is positioned.

In other embodiments, the triggering of high-rate measurement reporting is based on the level of interference experienced by the UE 40. Still further, high-rate reporting may be required for some modes of communications—e.g., for high data rate operation. Thus, those skilled in the art will appreciate that the measurement reports 58 may be available to the base station 22 at a sufficiently high rate for other operational reasons and that as an additional or alternative feature the base station 22 and/or the UE 40 can be configured to trigger high-rate reporting based on interference levels, explicit signaling, and/or location tracking.

Therefore, in one or more embodiments, the method 400 includes the base station 22 receiving a series of timed channel quality or interference measurement reports 58 from the UE 40, calculating an interference variance from the received reports, and determining that such interference variance is excessive, in dependence on comparing the interference variance to a defined interference threshold. In at least one such embodiment, the base station 22 controls a reporting rate for the series of channel quality or interference measurement reports 58, to increase the reporting rate responsive to detecting that the UE 40 is in a cell edge area of the serving cell 24 associated with the base station 22.

Further, in at least one such embodiment, the method 400 includes the base station 22 determining the transmission pattern blindly from the series of quality or interference measurement reports 58. As an example, the base station 22 correlates fluctuations in the interference level over the series with known transmission timing in the network 20, and identifies timing characteristics for period of high interference at the UE 40.

Figure 3:
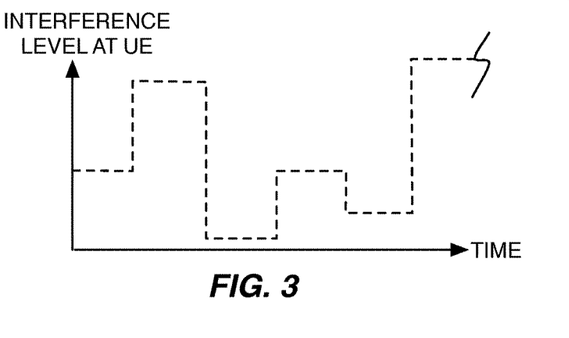
FIG. 3 is a diagram illustrating an example of varying levels of interference as seen at a wireless communication device.

Referring back to FIG. 3 for a moment, consider that each interference level/step in the diagram corresponds to one Transmission Time Intervals (TTIs). Within a given time window comprising N consecutive TTIs, the average/mean interference level is obtained at the UE 40. This average value (or the average value plus an epsilon value) is considered the interference criterion/threshold. Values above this interference threshold are considered high interference values & the ones below the threshold are classified low interference values. According to this approach, TTIs 2 and 4 of FIG. 3 are considered low interference values and correspond to estimated ABSFs. The TTIs 0, 1, 3, and 5 correspond to normal subframes.

Notably, in at least one such embodiment, the method 400 includes the base station 22 acquiring transmission timing information for the interfering transmissions, and confirming or revising the transmission pattern as blindly determined, in dependence on the acquired transmission timing information.

Such transmission timing information comprises, for example, scheduling information from a neighboring base station 22, or from a micro base station 26, or from another supporting entity 32 in the network 20 that has access to transmission timing or other scheduling information for the interfering transmissions 46.

More broadly, in at least one embodiment of the method 400, the base station 22 acquires transmission timing information for the interfering transmissions from another node in the network 22, and confirms or revises the transmission pattern that it determined, based on the acquired transmission timing information. Note that such operation does not mean that the base station 22 requires transmission timing information from another node to determine the transmission pattern; rather, in this embodiment, transmission timing provided to the base station 22 from another node is used to revise or otherwise improve the results of blind detection.

Of course, in one or more embodiments, the base station 22 detects the transmission pattern based on receiving a pattern indicator 56 from the UE 40. In such cases, the processing "intelligence" for discerning the transmission pattern from interference measurements resides at the UE 40. Conversely, in one or more other embodiments, the base station 22 detects the transmission pattern based on its evaluation of measurement reports 58 received from the UE 40. In such embodiments, the processing intelligence for discerning the transmission pattern resides in the base station 22. In either case, the base station 22 may adjust, revise, verify, or otherwise improve its understanding of the transmission pattern, based on receiving transmission pattern information from one or more other entities in the network 20. Such information may be received from, e.g., a neighboring base station 22 or 26, another supporting entity 32, such as a RNC, MME, or any other network node having access to transmission timing or scheduling information associated with the interfering transmissions 46.

Figure 8:
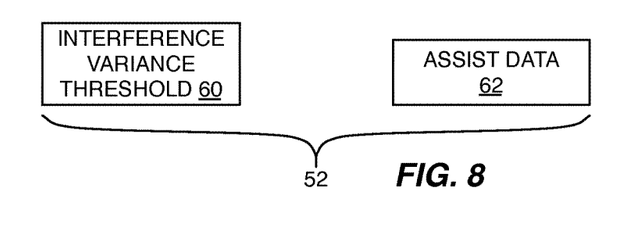
FIG. 8 is a diagram of signaling information elements from a base station to a wireless communication device, according to an embodiment of the present invention.

FIG. 8 illustrates an example for the DL signaling 52, as sent from a base station 22 or 26, to a UE 40 served by that base station. In the illustration, one sees an interference variance threshold 60 as a first information element or data item, and assistance data 62, as a second information element or data. In one example embodiment, sending the assistance data 62 comprises sending to the UE 40 information identifying possible transmission patterns for the interfering transmissions, to assist the UE in determining the transmission pattern. In other words, in an embodiment where the processing intelligence for detecting the transmission pattern of interfering signals 46 resides at the UE 40, the base station 22 that supports the UE 40 can send information to the UE 40, to assist its pattern detection operations. For example, the base station 22 sends selected scheduling information or transmission timing information for one or more neighboring base stations 22, or more generally sends values representing possible or most likely characteristics for the interfering transmissions 46.

Of further use at the UE 40, in one or more embodiments of the method 400, the serving base station 22 sends the interference variance threshold 60 as a numeric value, for example, which is used by the UE 40 to determine when interference variation at the UE 40 is deemed excessive. The interference variance threshold 60 may be an absolute value, e.g., a dB value, or it may be a relative value, or it may be an indicator that maps to a defined threshold value or range that is known or signaled to the UE 40. In either case, the method 400 in one or more embodiments includes sending a defined interference threshold 60 to the UE, where the defined interference threshold 60 sets the level of interference variation that is considered to be excessive.

Figure 9:
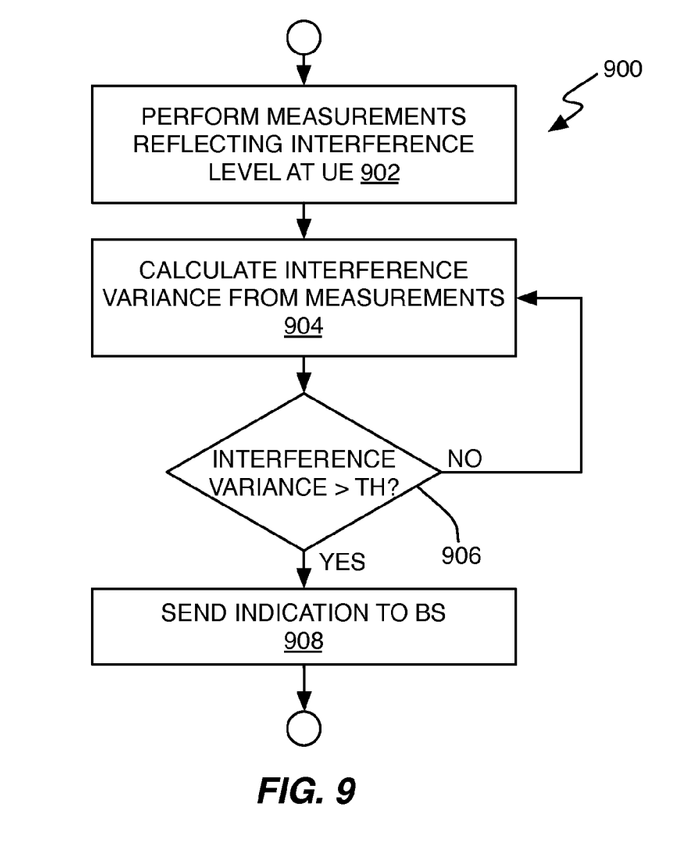
FIG. 9 is a logic flow diagram of one embodiment of a method of a wireless communication device detecting excessive interference variance and signaling an indication thereof.

FIG. 9 illustrates a complementary method 900 of processing carried out by a UE 40. The method 900 includes the UE 40 performing measurement reflecting interference levels at the UE (Block 902). "Reflecting" in this sense means a measurement value that directly or indirectly indicates the level of interference experienced at the UE 40 for a given measurement period. The indication could be a relative indication, such as signal-to-noise ratio (SNR) or signal-to-noise-plus-interference ratio (SNIR), or it could be an absolute indication, e.g., of received signal power. In one embodiment, the measurement value is a Channel Quality Indicator or "CQI" value that is related to the modulation and coding scheme in use, but is also proportional or otherwise related to SINR.

The method 900 continues with the UE 40 calculating the variation in interference levels over time (interference variance) at the UE 40, based on its measurements of interference (Block 904). Such measurements are, for example, performed on a subframe or TTI basis, for example, which translates into a 1 ms interval in LTE and a 2 ms interval in WCDMA/HSPA.

Further, processing continues with the UE 40 comparing the interference variance to a defined interference threshold 60 (Block 906). For example, the UE 40 receives the interference threshold 60 from its serving base station 22 via the DL signaling 52, and uses that signaled value to make the comparison.

If the interference variance is not greater than the threshold (NO from Block 906), the method loops or otherwise repeats with updated calculations of the interference variance. In this regard, it should be understood that the generation of measurements at the UE 40 (Block 902) might be an ongoing or background process, such that there is a continually or repeatedly updated set of measurements to evaluate for purposes of determining the interference variance.

More broadly, it will be appreciated that at least some steps in the method 900 may be performed together or in a different order than illustrated, or may be performed on an ongoing or repeating basis. Still further, it will be appreciated that the method 900 may be performed in conjunction with, or as part of other processing operations being carried out by processing circuits in the UE 40. Similar qualifications and understandings apply to the earlier-illustrated method 400, as performed by processing circuits in a base station 22 or other node in the network 20.

Figure 10:
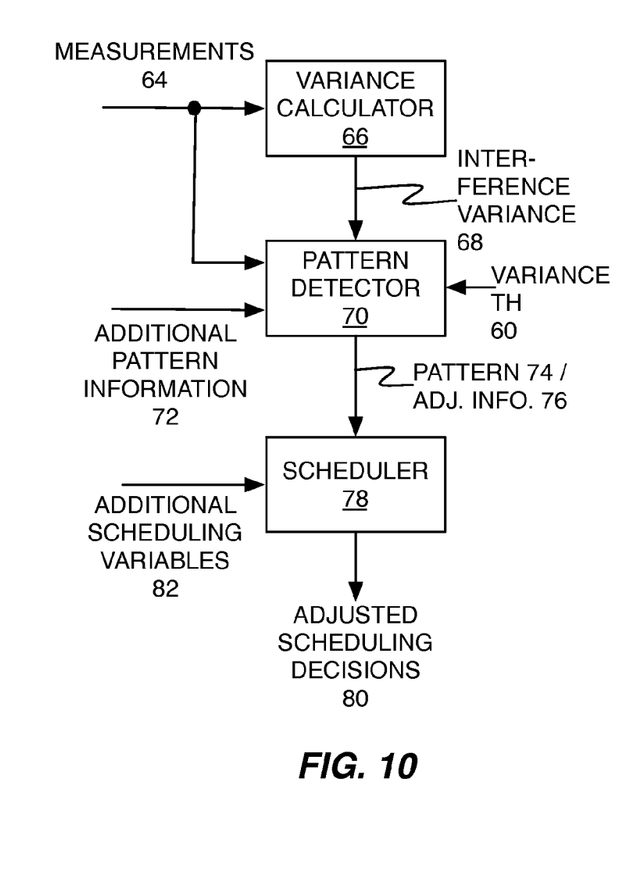
FIG. 10 is a processing diagram illustrating one embodiment of functional processing and associated circuitry at a base station.

FIG. 10 illustrates an example of functional circuits for carrying out processing included in or supporting either the method 400 at the base station 22 or other network node, or the method 900 at the UE 40. The diagram depicts measurements 64 input to a variance calculator 66. By way of example, the measurements are SNR/SNIR values, CQI values, RSSI, or other such measurements that reflect interference levels at the UE 40.

The variance calculator 66 evaluates or otherwise processes the measurements 64, to produce an interference variance 68, which in an example sense is a numeric value indicating the variation in interference as seen by the UE 40 over some running window of time. In turn, a pattern detector 70 evaluates the interference variance 68, supplemented in one or more embodiments with additional pattern information 72, to determine the transmission pattern 74 of the interfering transmissions 46 seen by the UE 40. The pattern detector 70 also may generate adjustment information 76 corresponding to the transmission pattern 74, for use by a scheduler 78, which is also referred to herein as a "scheduling circuit."

The scheduler 78 uses the transmission pattern 74 (directly or indirectly in terms of the adjustment information 76 derived from the transmission pattern 74) to "adjust" scheduling decisions 80 being made with respect to the UE 40, to at least partly avoid the interfering transmissions 46. Such adjustments comprise, for example, shifting the timing of scheduled transmissions to or from the UE 40, to time-wise avoid the interfering transmissions 46. Additionally, or alternatively, the adjustments comprising selecting frequencies or other channelization resources so as to avoid coincident use of resources associated with the interfering transmissions 46.

Note, too, that the scheduler 78 is, in general, a complex processing unit and considers a potentially complex host of scheduling variables 82 when making scheduling decisions. Thus, the adjusted scheduling decisions 82 shown in the diagram can be understood as scheduling decisions that are altered with respect to the "nominal" scheduling decisions that would have been made by the scheduler 78 without benefit of the transmission pattern 74 and/or corresponding adjustment information 76 from the pattern detector 70. Those of ordinary skill in the art will appreciate that such processing—e.g., generating adjusted scheduling decisions 82—may be performed for multiple other UEs 40, using pattern information 74 and/or adjustment information 76 corresponding to those other UEs 40.

In one embodiment, the functional circuits illustrated in FIG. 10 are all implemented in processing circuitry within a network node, such as a macro base station 22 in the network 20. The measurements 64 in such an embodiment are extracted from or derived from the measurement reports 58 received from the UE 40. In another embodiment, the variance calculator 66 is implemented in the UE 40. In this case, the UE 40 calculates the interference variance 68 and sends that value to the network 20, or sends the earlier-mentioned excess interference indicator 54 in response to determining that the interference variance 68 exceeds the interference variance threshold 60.

The pattern detector 70 also can be implemented in the UE 40, in which case the UE 40 sends the transmission pattern 74 to the network 20 via the pattern indicator 56 carried in one or more embodiments of the UL signaling 50. Alternatively, the pattern detector 70 is implemented in a network node, such as the macro base station 22.

Regardless, it will be understood by those of ordinary skill in the art that such functional processing circuits, which also may be referred to as "units" or "processing units," are implemented using programmable circuits, non-programmable circuits (e.g., fixed or dedicated hardware circuits), or some mix thereof.

In terms of programmable circuit implementations, the functional circuits illustrated by way of example in FIG. 10 may be implemented using one or more digital processing circuits, such as microprocessor-based or DSP-based processing circuits, wherein the functional configuration of such processing circuitry is set or fixed by the execution of computer program instructions stored in a computer-readable medium, such as FLASH, EEPROM, or other non-volatile storage circuit or device. Correspondingly, those skilled in the art will appreciate that method 400 and method 900 represent processing algorithms that are, in one embodiment, implemented via computer program instructions stored in a network node (method 400) and in a UE 40 (method 900).

Figure 11:
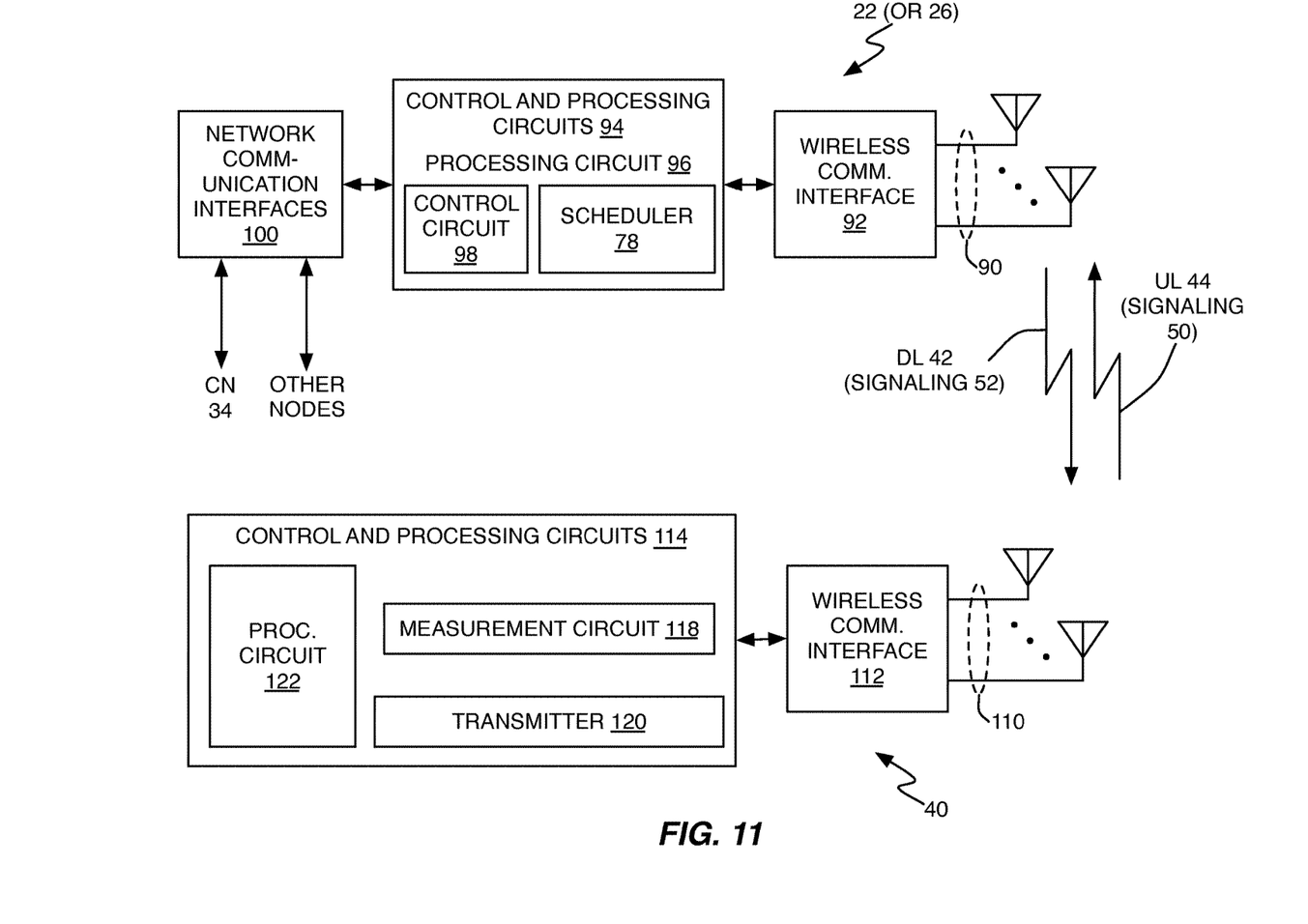
FIG. 11 is a block diagram of one embodiment of a base station and a wireless communication device, as configured according to the teachings herein.

FIG. 11 provides further example embodiments of a base station 22 and a UE 40 configured according to the teachings herein. Without repeating its reference number in the following description, it will be understood that FIG. 11 also may depict an embodiment of a pico base station 26.

As illustrated, the base station 22 includes one or more transmit/receive antennas 90, and may have a plurality of such antennas for Multiple-Input-Multiple-Output (MIIMO) operation, beam-forming, sectorized transmission, etc. The base station 22 further includes a wireless communication interface (transceiver) 92 that is coupled to the antennas 90 and comprises, for example, radio frequency circuitry for transmitting signals to UEs 40 and receiving signals from them. For example, in an LTE-based embodiment, the wireless communication transceiver 92 comprises Orthogonal Frequency Division Multiplex (OFDM) receivers and transmitters. In a WCDMA-based embodiment, the wireless communication transceiver 92 comprises CDMA receivers and transmitters The base station 22 further includes control and processing circuits 94 that provide the base station 22 with its operational capability. Such circuits comprise, for example, microprocessor or other computer-based circuitry, and may be implemented as resource pools using line cards, backplanes, etc. Further, such circuits include, in particular, a processing circuit 96 that includes a control circuit 98 and the previously mentioned scheduler 78. These circuits may be "functional" processing circuits implemented at least in part using programmable digital processing circuitry executing stored computer program instructions.

The base station 22 further includes one or more network communication interfaces 100. These network communication interfaces 100 communicatively link the base station 22 to any one or more of the CN 34, one or more supporting entities 32, other base stations 22 or 26, etc. Note that in the case of a relay-type pico base station 26, the network communication interface may be omitted or modified and/or the communication interface 92 is adapted as needed for the required relay operation. In an LTE-based example, the wireless communication interface 92 may be configured to support the Uu and Un interfaces.

The base station 22 (or 26) thus can be understood as an example network node that is configured for use in the network 20, where its communication interface 92 is configured to receive signaling 50 directly or indirectly from a UE 40 served by a cell 24 or 27 of the network 20 that is controlled by the network node. The processing circuit 96 is configured to detect from the signaling 50 that the UE is experiencing excessive interference variation arising from interfering transmissions 46 by an interfering node that is in or proximate to the serving cell of the UE 40.

The processing circuit 96, e.g., via configuration of the control circuit 98, is configured to carry out the method 400 illustrated and described earlier herein, or variations of that method. In this regard, the processing circuit 96 can be understood as including at least the scheduler 78 from FIG. 10, and the control circuit 98 in one embodiment includes the variance calculator 66 and pattern detector 70 shown in FIG. 10. That is, in one embodiment, the control circuit 98 receives measurements 64 in a series of measurement reports 58 sent from a UE 40, and computes the interference variance 68 therefrom, and additionally determines a transmission pattern 74 for interfering transmissions 46, as seen by the UE 40, and adjustment information 76, for use by the scheduler 78.

In another embodiment, the control circuit 98, or processing circuit 96 at large, receives at least the interference indicator 54 from the UE 40, and determines based on that receipt that the UE 40 is experiencing excessive interference variation. In the same or another embodiment, the control circuit 98 or other processing unit within the processing circuit 96 determines the transmission pattern 74 based on receiving an indication of that pattern in a pattern indicator 56 sent from the UE 40.

In general, it should be understood that the above description of a macro base station 22 as being adapted to carry out the present invention in relevant part is not limiting. One or more other network nodes may be configured to carry out all or a portion of the interference variance detection, transmission pattern determination, and interference avoidance scheduling described above. Such operation may be in addition to that described above for the macro base station 22, or may be in alternative to such operation at the macro base station 22.

Examples of such other nodes include, as previously mentioned, one or more of the pico base stations 26. In at least one embodiment, an appropriately configured pico base station 26 includes embodiments of the above-described communication interface 92 and processing circuit 96. Still further, it will be understood that multiple nodes in the network—e.g., multiple radio base stations—may be configured to practice the invention, either independently in some joint sense, at least insofar as two neighboring nodes may be configured to exchange transmission timing or other pattern information to aid transmission pattern detection and/or interference avoidance at the other node via corresponding scheduling adjustments.

Turning to the illustrated UE 40, one sees that the UE 40 comprises one or more transmit/receive antennas 110 and an associated wireless communication transceiver 112 that is configured to communicate with a serving node in the network 20, e.g., a serving base station 22 or 26. The UE 40 further includes control and processing circuits 114, including a receiver 116 equipped with a measurement circuit 118, and further including a transmitter 120 and a processing circuit 122 that is associated with the receiver 116 and the transmitter 120.

The measurement circuit 118 is configured to generate measurements 64 reflecting interference levels at the UE 40, and in one or more embodiments the processing circuit 122 is configured to calculate an interference variance 68 from the measurements 64. Further, the processing circuit 122 is configured to send an indication 54 to the serving node, responsive to determining that the interference variance 68 exceeds a defined interference threshold 60 signaled to the UE 40.

In one embodiment, the processing circuit 122 is further configured to detect from the measurements 64 and/or interference variance 68 the transmission pattern 74 associated with the interfering signals 46 that give rise to the interference variance 68 seen by the UE 40. In the same or another embodiment, the processing circuit 122 is configured to receive assistance data 62 comprising information indicating possible transmission patterns used by the interfering node, and to detect the transmission pattern 74 from the measurements 64 based on the assistance data 62.

For example, the assistance data 62 may comprise one or more possible timing patterns that the processing circuit 122 correlates with the observed variance of interference at the UE 40, such that the transmission pattern 74 is identified as the best matching one of the possible patterns. More generally, the assistance data 62 can be understood as information that allows the UE 40 to better recognize or detect the transmission pattern 74 from the measurements 64, or to otherwise reduce the search space that must be evaluated to determine the transmission pattern 74. Regardless of how the transmission pattern 74 is detected by the UE 40, in embodiments where the UE 40 performs such detection, the processing circuit 122 is configured to send an indication 56 of the transmission pattern 74 detected from the measurements 64.

Of further interest, the teachings herein can be implemented advantageously with respect to the use of "Almost Blank Subframes" in an embodiment of the network 20 that is based on LTE Rel. 10. For example, Time Division (TD) transmission patterns are specified in such systems for CSG Home eNBs, macro eNBs and for inbound RNs—i.e., 1:2, 1:4, and 1:8, where those number pairs indicate the number of Almost Blank Subframes to the number of Subframes. Consequently, a UE 40 can readily detect these characteristic TD transmission patterns. According to an example embodiment of the present invention, then, a UE 40 detects such a TD transmission pattern in the interference variations seen by the UE 40, and informs its serving base station 22 or 26, which perform resource allocations (scheduling) in consideration of the detected TD transmission pattern.

For example, at least those UEs 40 at cell edges try to detect TD transmission patterns by following the variance of interference (e.g., expressed as a series of Received Signal Strength Indicator, RSSI, values) on subframe basis. In case the variance exceeds a threshold at given UE 40, that UE 40 notifies its serving base station. UEs 40 that are attempting to detect TD transmission patterns may be selected by the network 20, such as where the network 20 transmits the value of the variance threshold to be used by the selected UEs 40 for detecting excessive interference variance. The network 20 also may transmit a list of possible TD transmission patterns (e.g., Almost Blank Subframe transmission patterns), which can be understood as an example type of assistance data 62. (There might be some cases in which normal subframes do not contain data bits to be transmitted. In such cases, the UE 40 might detect an erroneous or non-existent TDM transmission pattern. Such incorrect detection is not likely. Further, even if such detection occurs within one observation time window, it is very unlikely that the data activity pattern will remain the same in consecutive observation windows.) Upon detection of TD transmission patterns, the UEs 40 notify their serving base stations, which schedule the notifying UEs 40 at subframes during which the interfering nodes (LPNs or other macro base stations in neighbor cells) mute their transmission.

Figure 12:
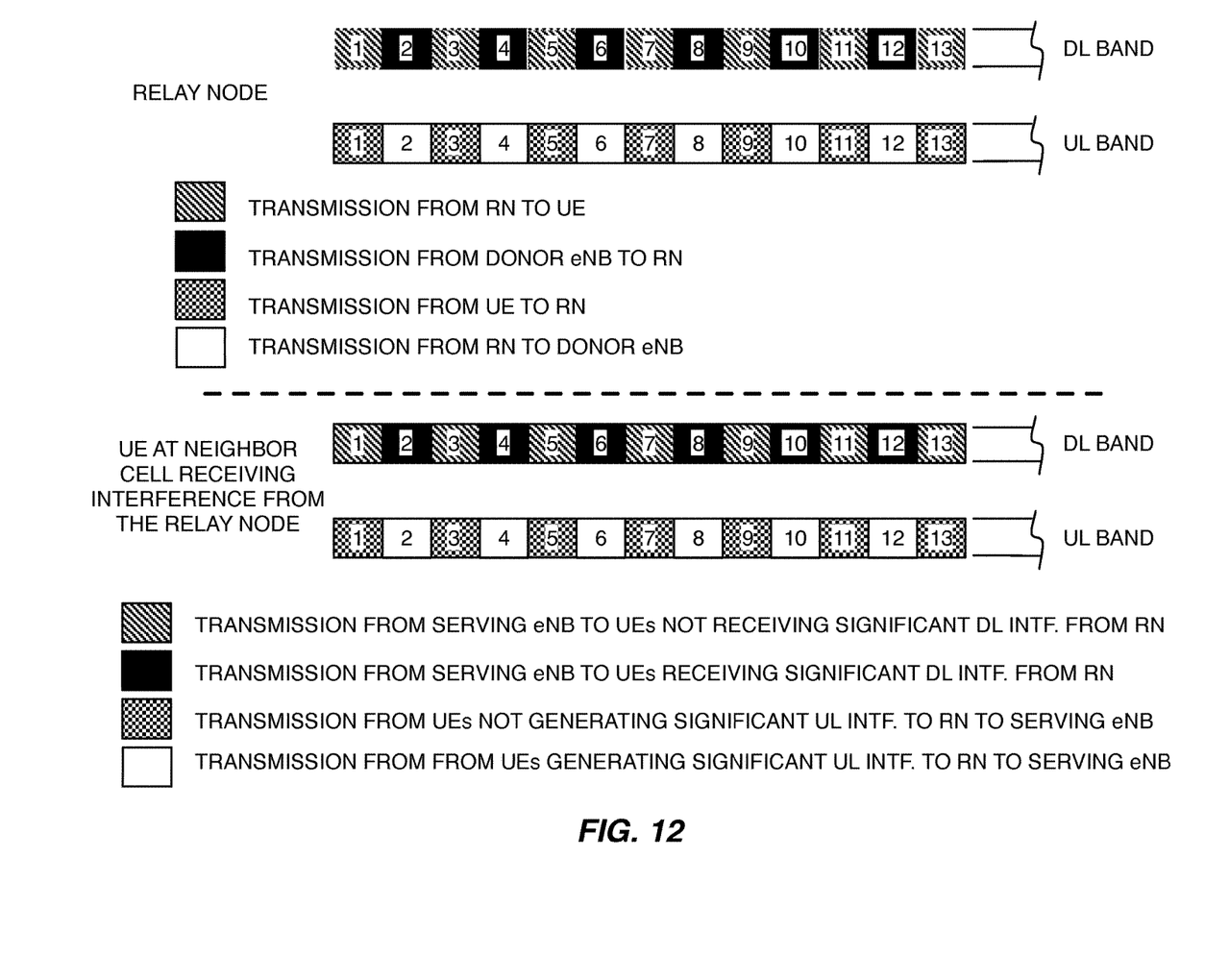
FIG. 12 is a diagram of one embodiment of coordinating transmission/reception between wireless communication devices seeing certain Time Division (TD) transmission patterns and the corresponding nodes that are employing such patterns.

FIG. 12, for example, illustrates one embodiment of coordinating transmission/reception between UEs 40 seeing TD transmission patterns within given serving cells 24 or 27 and the corresponding nodes that are employing those detected TD transmission patterns.

In more detail, consider a heterogeneous network that includes relay nodes. The Un, Un configuration can be seen in the upper portion of FIG. 12. That is, one sees the transmission pattern for a relay node of a given cell in the upper part of FIG. 12. During odd subframe numbers, 1, 3, 5, 7, 9, etc., the relay node transmits on the DL to its UEs 40 using the Uu interface. During even subframes, the DeNB supporting the relay transmits on the DL to the relay node using the Un interface.

In the most common scenarios, UEs 40 that are located at neighbor cells are not affected by transmissions from the DeNB to the relay node. However, neighbor-cell UEs 40 that are operating near the relay node are affected by transmissions from the relay node to UEs 40 being served by the relay node. Therefore, an affected UE 40 and/or its serving base station, can detect the TDM pattern of the relay node's interfering transmissions, and the serving base station can correspondingly not schedule the affected UE 40 at the same time instants during which the relay node is transmitting to its supported UEs 40 (subframes 1, 3, . . . ).

Hence, those neighbor-cell UEs 40 that are affected by the relay node's transmissions are scheduled at even subframes (2, 4, 6, . . . ), when the relay node is inactive. As noted, during these even subframes, the DeNB transmits to the relay node. The same type of detection and corresponding scheduling avoidance can be applied in the UL.

Among its numerous advantages, the present invention reduces the probability of collisions between cell edge users, and hence provides higher spectral efficiency in the network 20. The approach taught herein is straightforward and represents an effective, efficient approach to reducing inter-cell interference. Of course, modifications and other embodiments of the disclosed invention(s) will come to mind to one skilled in the art having the benefit of the teachings presented in the foregoing descriptions and the associated drawings.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A wireless communication device configured for operation in a wireless communication network and comprising:
 a wireless communication transceiver configured to communicate with a serving node in the wireless communication network;

a measurement circuit configured to perform measurements reflecting interference levels at the wireless communication device; and a processing circuit configured to calculate an interference variance from said measurements; and send an indication to the serving node, responsive to determining that the interference variance exceeds a defined interference variance threshold signaled to the wireless communication device.

2. The wireless communication device of claim 1, wherein the processing circuit is further configured to detect from said measurements a transmission pattern used by an interfering node for transmitting interfering signals giving rise to said interference variance.

3. The wireless communication device of claim 2, wherein the processing circuit is further configured to receive assistance data comprising information indicating possible transmission patterns used by the interfering node, and to detect the transmission pattern from said measurements using said assistance data.

4. The wireless communication device of claim 2, wherein the processing circuit is configured to send an indication of the transmission pattern detected from said measurements.

5. A method of reporting interference conditions from a wireless communication device to a wireless communication network comprising:

performing measurements reflecting interference levels at the wireless communication device;

calculating an interference variance from said measurements;

sending an indication from the wireless communication device, responsive to determining that the interference variance exceeds a defined interference threshold signaled to the wireless communication device.

6. The method of claim 5, further comprising detecting from said measurements or said interference variance a transmission pattern used by an interfering node in said wireless communication network, for transmitting interfering signals giving rise to said interference variance.

7. The method of claim 6, further comprising receiving assistance data comprising information indicating possible transmission patterns used by the interfering node, and wherein said detecting comprises detecting the transmission pattern from said measurements using said assistance data.

8. The method of claim 6, further comprising sending an indication of the transmission pattern detected from said measurements.

* * * * *